United States Patent
Huang et al.

(10) Patent No.: US 10,391,875 B2
(45) Date of Patent: Aug. 27, 2019

(54) VEHICLE ALIGNMENT FOR WIRELESS CHARGING

(71) Applicant: WiTricity Corporation, Watertown, MA (US)

(72) Inventors: Chang-Yu Huang, Auckland (NZ); Jonathan Beaver, Auckland (NZ); Mickel Bipin Budhia, Auckland (NZ); Michael Le Gallais Kissin, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 158 days.

(21) Appl. No.: 15/656,915

(22) Filed: Jul. 21, 2017

(65) Prior Publication Data

US 2019/0023141 A1    Jan. 24, 2019

(51) Int. Cl.
| | | |
|---|---|---|
| *H02J 7/02* | (2016.01) | |
| *B60L 11/18* | (2006.01) | |
| *H02J 50/12* | (2016.01) | |
| *H02J 50/90* | (2016.01) | |
| *B60L 53/12* | (2019.01) | |
| *B60L 53/38* | (2019.01) | |
| *B60L 53/36* | (2019.01) | |

(52) U.S. Cl.
CPC .......... *B60L 11/1833* (2013.01); *B60L 53/12* (2019.02); *B60L 53/36* (2019.02); *B60L 53/38* (2019.02); *H02J 7/025* (2013.01); *H02J 50/12* (2016.02); *H02J 50/90* (2016.02)

(58) Field of Classification Search
CPC ....................................................... H02J 7/025

USPC ......................................................... 320/108
See application file for complete search history.

(56) References Cited

U.S. PATENT DOCUMENTS

| | | | |
|---|---|---|---|
| 2013/0234503 A1 | 9/2013 | Ichikawa et al. | |
| 2015/0306966 A1 | 10/2015 | Ichikawa | |
| 2016/0023557 A1 | 1/2016 | Dimke et al. | |
| 2016/0181875 A1 | 6/2016 | Long et al. | |
| 2017/0005523 A1 | 1/2017 | Widmer et al. | |
| 2017/0179772 A1* | 6/2017 | Asanuma | H02J 17/00 |
| 2018/0191207 A1* | 7/2018 | Asanuma | H02J 50/90 |

* cited by examiner

*Primary Examiner* — Edward Tso
*Assistant Examiner* — Ahmed H Omar
(74) *Attorney, Agent, or Firm* — Hunter Clark PLLC

(57) ABSTRACT

A method of operating a wireless-power receiver comprises: determining a first resonant frequency of a resonant circuit, of the wireless-power receiver, corresponding to a first time at which the wireless-power receiver is disposed at a first longitudinal offset from a power transmitter, the first longitudinal offset being relative to a length of a device containing the wireless-power receiver; determining a second resonant frequency of the resonant circuit, corresponding to a second time at which the wireless-power receiver is disposed at a second longitudinal offset from the power transmitter, the second longitudinal offset being relative to the length of the device containing the wireless-power receiver, and the first longitudinal offset being different from the second longitudinal offset; and determining a lateral misalignment of the wireless-power receiver relative to a wireless-power transmitter based on the first resonant frequency and the second resonant frequency.

34 Claims, 10 Drawing Sheets

VEHICLE ALIGNMENT FOR WIRELESS CHARGING

TECHNICAL FIELD

The disclosure relates generally to wireless power delivery to electronic devices, and in particular to alignment of a power receiver and a power transmitter of a wireless electric vehicle charging system.

BACKGROUND

Remote systems, such as vehicles, have been introduced that include locomotion power derived from electricity received from an energy storage device such as a battery. Such energy storage devices need to be periodically charged. For example, hybrid electric vehicles include on-board chargers that use power from vehicle braking and traditional motors to charge the vehicles. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via an electromagnetic field) to be used to charge electric vehicles may overcome some of the deficiencies of wired charging solutions.

In wireless electric vehicle charging (WEVC) systems, aligning a power receiver with a power transmitter helps ensure high efficiency power transfer. Further, aligning the power receiver with the power transmitter helps ensure that charging power is provided when a vehicle is over a charging pad, and thus a person or other living object is not over the charging pad when the charging power is provided.

SUMMARY

The following detailed description and accompanying drawings provide a better understanding of the nature and advantages of the disclosure.

An example of a wireless-power receiver comprises: a resonant circuit including a power transfer element, the resonant circuit having a resonant frequency; a power-receiving circuit coupled to the resonant circuit; and a controller, coupled to the resonant circuit, configured to: determine a first resonant frequency of the resonant circuit corresponding to a first time; determine a second resonant frequency of the resonant circuit corresponding to a second time; and determine an offset of the power transfer element relative to a power transmitter based on the first resonant frequency and the second resonant frequency.

An example of a method of operating a wireless-power receiver comprises: determining a first resonant frequency of a resonant circuit, of the wireless-power receiver, corresponding to a first time at which the wireless-power receiver is disposed at a first longitudinal offset from a power transmitter, the first longitudinal offset being relative to a length of a device containing the wireless-power receiver; determining a second resonant frequency of the resonant circuit, corresponding to a second time at which the wireless-power receiver is disposed at a second longitudinal offset from the power transmitter, the second longitudinal offset being relative to the length of the device containing the wireless-power receiver, and the first longitudinal offset being different from the second longitudinal offset; and determining a lateral misalignment of the wireless-power receiver relative to a wireless-power transmitter based on the first resonant frequency and the second resonant frequency.

Another example of a wireless-power receiver comprises: means for resonating, including a power transfer element, the means for resonating having a resonant frequency; power-receiving means coupled to the means for resonating; first determining means, coupled to the means for resonating, for: determining a first resonant frequency of the means for resonating corresponding to a first time; and determining a second resonant frequency of the means for resonating corresponding to a second time; and second determining means, coupled to the first determining means, for determining a lateral misalignment of the power-receiving means relative to a wireless-power transmitter based on the first resonant frequency and the second resonant frequency.

An example of a non-transitory, processor-readable storage medium stores processor-readable instructions configured to cause a processor to: determine a first resonant frequency of a resonant circuit, of a vehicular wireless-power receiver, corresponding to a first time; determine a second resonant frequency of the resonant circuit, of the vehicular wireless-power receiver, corresponding to a second time; and determine an offset of a power transfer element of the vehicular wireless-power receiver relative to a power transmitter based on the first resonant frequency and the second resonant frequency; wherein the offset of the power transfer element relative to the power transmitter is a lateral misalignment, of the power transfer element relative to the power transmitter, substantially transverse to at least one of a direction of travel of a vehicle containing the vehicular wireless-power receiver or a line through centers of a plurality of power transmitters.

Figure 1:
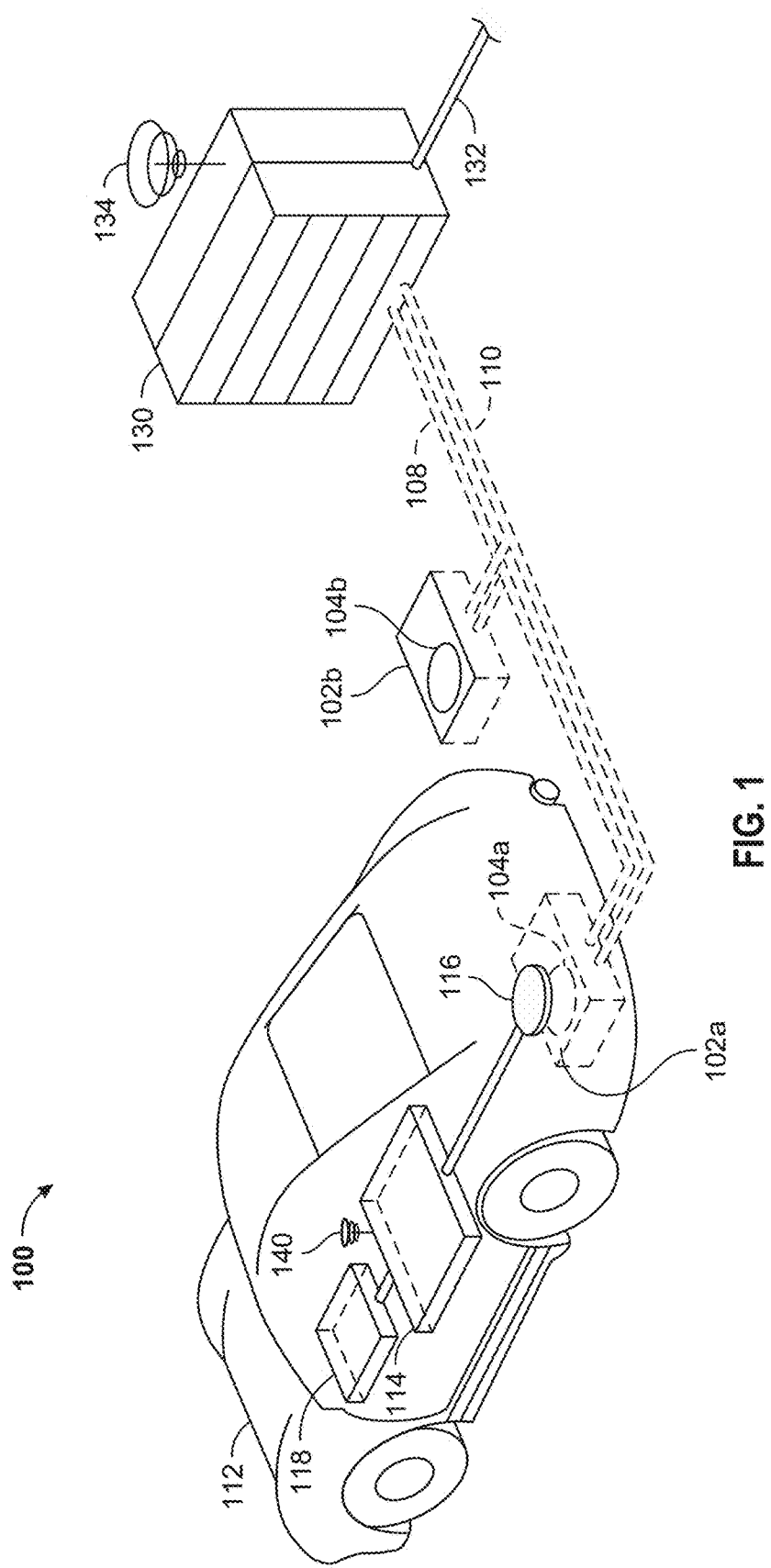
FIG. 1 is a perspective view of an example wireless electric vehicle charging system.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is a description of example implementations and does not represent the only implementations in which the invention may be practiced. The term "exemplary" used throughout this description means "serving as an example, instance, or illustration," and does not require that the item(s) described as exemplary is(are) preferred or advantageous over other implementations. The detailed description includes specific details for the purpose of providing a thorough understanding of the implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into an electro-magnetic field (e.g., a magnetic field) may be received, captured by, or coupled by a "receiving element" to achieve power transfer.

Techniques are discussed herein for aligning a primary side and a secondary side of a wireless charging system. For example, techniques are discussed for aligning a primary side and a secondary side of a wireless electric vehicle charging system. The primary side is configured to provide charging power to the secondary side. As the secondary side, e.g., in a vehicle, moves relative to the primary side, e.g., over a charging base pad on the ground, the secondary side emits a signal (e.g., a magnetic field produced by the secondary side to induce a current/voltage in the primary side), and a resonant frequency of the secondary side is determined. The resonant frequency is determined for different positions of the secondary side relative to the primary side. For example, as the vehicle is driven over the base pad along a length of the pad, the resonant frequency of the secondary side is determined at different lengthwise positions. The multiple resonant frequencies are used, e.g., by mapping the resonant frequencies to known lateral (side-to-side) offsets, to determine a lateral offset of the secondary side relative to the primary side. The determined offset can be used to make alignment adjustments, either for a single base pad or for other base pads such as a sequence of base pads disposed along a road. Other examples are within the scope of the disclosure, some of which are discussed below.

To align a power receiver of a vehicle and a power transmitter, a coupling check may be performed. In the coupling check, lower power than the charging power is provided by the receiver, e.g., by exciting a coil in the vehicle. With the coil in the receiver excited, the voltage and/or current induced in the charging pad is monitored. Wireless communication between the charging pad and the vehicle provide the vehicle with indications of the monitored current/voltage. When the current/voltage exceeds a threshold, it is determined that the coupling between the transmitter and receiver is sufficient to provide sufficiently-efficient power transfer. The power transmitter is then excited to provide charging power to the receiver.

Items and/or techniques described herein may provide one or more of the following capabilities, as well as other capabilities not mentioned. Power transfer efficiency in a wireless power transfer system, such as a wireless electric vehicle charging system, can be improved. Alignment of one or more power transmitters with a power receiver may be improved. Indications of lateral alignment and/or misalignment between one or more power transmitters and a power receiver may be provided. These alignment indications may be used for manual alignment corrections or computer-driven alignment corrections. Alignment corrections may be provided to a vehicle without using communications (e.g., for some period that does not rely on or is less reliant on communications) between one or more charging pads and the vehicle. Alignment indications and alignment corrections can be determined using existing hardware, e.g., of a wireless electric vehicle charging system. Other capabilities may be provided and not every implementation according to the disclosure must provide any, let alone all, of the capabilities discussed.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like) and possible, whether presently known or not.

FIG. 1 is a diagram of a wireless charging system 100 for charging an electric vehicle 112, in accordance with some implementations. The wireless charging system 100 enables charging of an electric vehicle 112 while the electric vehicle 112 is parked near a base wireless charging system 102a. Spaces for two electric vehicles are illustrated in a parking area to be parked over corresponding base wireless charging systems 102a and 102b. In some implementations, a local power distribution center 130 may be connected to a power backbone 132 and configured to provide an alternating current (AC) or a direct current (DC) supply through a power link 110 to the base wireless charging systems 102a and 102b. The base wireless charging system 102a includes a base power transfer element 104a for wirelessly transferring (e.g., transmitting and/or receiving) power. Likewise, the base wireless charging system 102b includes a base power transfer element 104b for wirelessly transferring power. In some implementations (not shown in FIG. 1), the base power transfer elements 104a or 104b may be stand-alone physical units that are not part of the base wireless charging systems 102a or 102b. The electric vehicle 112 may include a battery unit 118, and an electric vehicle wireless charging system 114 including an electric vehicle power transfer element 116. In some implementations (not shown in FIG. 1), the vehicle power transfer element 116 may be part of the electric vehicle wireless charging system 114. In some implementations, the entity comprising the base power transfer element 104a is referred to as the base pad and the entity comprising the vehicle power transfer element 116 is referred to as the vehicle pad.

The electric vehicle power transfer element 116 may interact with the base power transfer element 104a for example, via a region of a wireless field generated by the base power transfer element 104a. In some implementations, the electric vehicle power transfer element 116 may receive power when the electric vehicle power transfer element 116 is located in an energy field produced by the base power transfer element 104a. The field corresponds to a region where energy output by the base power transfer element 104a may be captured by the electric vehicle power transfer element 116. For example, the energy output by the base power transfer element 104a may be at a level sufficient to charge or power the electric vehicle 112.

In some implementations, the field may correspond to the "near field" of the base power transfer element 104a. The near field may correspond to a region in which there are strong reactive fields resulting from the currents and charges in the base power transfer element 104a that do not radiate power away from the base power transfer element 104a. In some implementations, the near field may correspond to a region that is within about ½π of a wavelength of the base power transfer element 104a (and vice versa for the electric vehicle power transfer element 116).

The local power distribution center 130 may be configured to communicate with external entities (e.g., a power grid management system) via a communication backhaul 134, and with the base wireless charging system 102a via a communication link 108 (e.g., wired or wireless). For example, the communication backhaul 134 may communicate with an antenna 140 of the vehicle 112 regarding the charging infrastructure of the system 100.

In some implementations, the electric vehicle power transfer element 116 may be aligned with the base power transfer element 104a and, therefore, disposed within a near-field region simply by the driver positioning the electric vehicle 112 correctly relative to the base power transfer element 104a. In other implementations, the driver may be given visual, auditory, or tactile feedback, or combinations thereof, to determine when the electric vehicle 112 is properly placed for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minor driver intervention provided that the electric vehicle 112 is equipped with appropriate equipment such as a servo steering wheel, ultrasonic sensors, and intelligence to adjust the electric vehicle 112. In still other implementations, the electric vehicle power transfer element 116, the base power transfer element 104a, or a combination thereof, may have functionality for displacing and moving the power transfer elements 116 and 104a relative to each other to more accurately position them and develop more efficient coupling there between.

The base wireless charging system 102a may be located in a variety of locations. As non-limiting examples, some suitable locations include a parking area at a home of an owner of the electric vehicle 112, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may be no exposed electrical contacts and no or little mechanical wear out, thereby improving reliability of the wireless charging system 100. Manipulations with cables and connectors may not be needed, and there may be no cables, plugs, or sockets that may be exposed to moisture and water in an outdoor environment, thereby improving safety. There may be no sockets, cables, and plugs visible or accessible, thereby reducing potential vandalism of power charging devices. Further, since the electric vehicle 112 may be used as a distributed storage device to stabilize a power grid, a convenient docking-to-grid solution may help to increase availability of vehicles for Vehicle-to-Grid (V2G) operation. The wireless charging system 100 as described with reference to FIG. 1 may provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power from the power distribution grid to the electric vehicle 112 via the electric vehicle charging system 114 and the electric vehicle charging system 114 transfers power from the electric vehicle 112 via the base wireless charging system 102a to the grid, e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
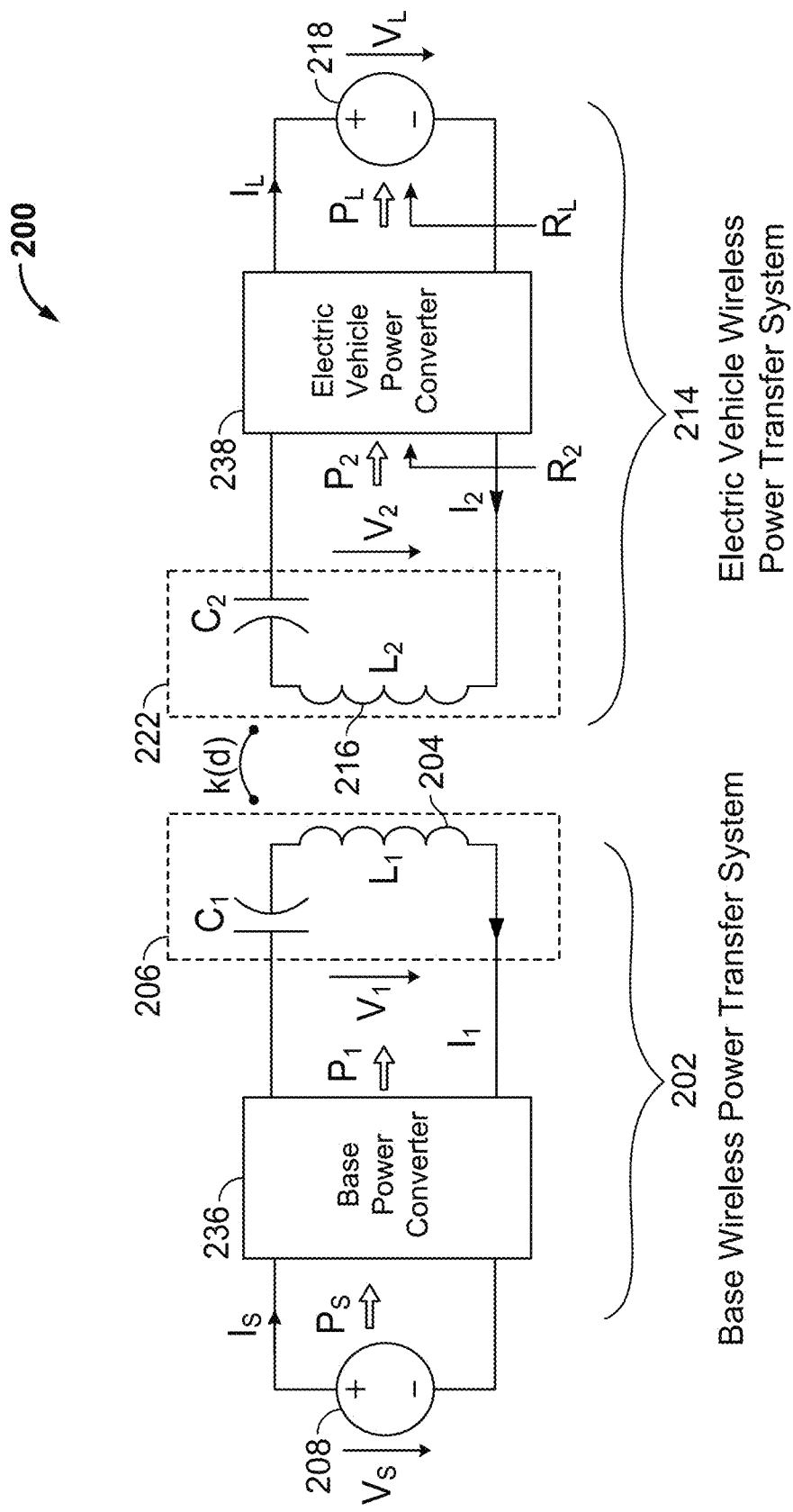
FIG. 2 is a schematic diagram of example components of a primary side and a secondary side of the wireless electric vehicle charging system shown in FIG. 1.

FIG. 2 is a schematic diagram of exemplary components of a wireless power transfer system 200 that may be used for inductive power transfer. As shown in FIG. 2, the wireless power transfer system 200 may be comprised of a base wireless power transfer system 202 and an electric vehicle wireless power transfer system 214. The base wireless power transfer system 202 may include a base transmit circuit 206 including a base power transfer element 204 having an inductance $L_1$. Analogously, as shown in FIG. 2, the electric vehicle wireless power transfer system 214 may include an electric vehicle receive circuit 222 including an electric vehicle power transfer element 216 having an inductance $L_2$.

Implementations of the base transmit circuit 206 and the electric vehicle receive circuit 222 described herein may use capacitively-loaded wire loops (i.e., multi-turn coils) forming a resonant circuit that is capable of efficiently coupling energy from a primary element (transmitter) to a secondary element (receiver) via a magnetic or electromagnetic near field if both primary and secondary elements are tuned to substantially a common resonant frequency (substantially the same resonant frequency). Using resonant circuits or structures for coupling energy may be referred to "magnetic coupled resonance," "electromagnetic coupled resonance," and/or "resonant induction." The operation of the wireless power transfer system 200 will be described based on power transfer from the power distribution grid via the base wireless power transfer system 202 and the electric vehicle wireless power transfer system 214 to an electric vehicle 112, but is not limited thereto. For example, as discussed above, the electric vehicle 112 may transfer power in the reverse direction via the electric vehicle wireless power transfer system 214 and the base wireless power transfer system 202 to the power distribution grid.

With reference to FIG. 2, a power supply 208 (e.g., AC or DC) supplies power $P_S$ to the base wireless power transfer system 202 to transfer energy to the electric vehicle 112 via the electric vehicle power transfer system 214. The base wireless power transfer system 202 includes a base power converter 236. The base power converter 236 may include circuitry such as an AC/DC converter configured to convert power from standard mains AC to DC power at a suitable voltage level, and a DC/AC converter configured to convert DC power to power at an operating frequency suitable for wireless high-power transfer. The power converter 236 supplies power $P_1$ to the base transmit circuit 206 including the base power transfer element 204 to emit a field at a desired frequency. The base transmit circuit 206 may include a capacitor $C_1$ coupled in series to a coil of the base power transfer element 204 as shown in FIG. 2 by example. Alternatively, the base transmit circuit 206 may be formed with the capacitor $C_1$ coupled in parallel to the coil, or may be formed of several reactive elements in any combination of parallel or series topology. The capacitor $C_1$ or the reactive elements may be provided to form a resonant circuit with the base power transfer element 204 near or at the operating frequency defined by the base wireless power transfer system 202. The base power transfer element 204 receives the power $P_1$ and wirelessly transmits power at a level sufficient to charge or power the electric vehicle 112. For example, the power level provided wirelessly by the base power transfer element 204 may be on the order of kilowatts (kW) (e.g., anywhere from 1 kW or lower to 110 kW or higher).

The electric vehicle power transfer element 216 may be positioned within the near field of a primary electromagnetic field transmitted by the base power transfer element 204. In this case, the base power transfer element 204 and the electric vehicle power transfer element 116 may become coupled to one another such that power may be transferred to the electric vehicle receive circuit 222. Element k(d) represents the coupling coefficient resulting at coil separation d. The electric vehicle receive circuit 222 may include a capacitor $C_2$ coupled in series with a coil of the electric vehicle power transfer element 216 as shown in FIG. 2 by example. Alternatively, the electric vehicle receive circuit 222 may be formed with the capacitor $C_2$ coupled in parallel with the coil, or may be formed of several reactive elements in any combination of parallel or series topology. The capacitor $C_2$ or the reactive elements may be provided to form a resonant circuit with the electric vehicle power transfer element 216 near or at the operating frequency as defined by the electric vehicle wireless power transfer system 214. Due to the resonance of the electric vehicle receive circuit 222, the electric vehicle power transfer element 116 may generate a secondary electromagnetic field. The electric vehicle receive circuit 222 receives power $P_2$ and provides the power $P_2$ to an electric vehicle power converter 238 of the electric vehicle wireless power transfer system 214.

As just described, the resonant frequency may be based on the inductance and capacitance. As shown in FIG. 2, inductance may generally be the inductance of the power transfer element (e.g., a coil), whereas, capacitance may be added to the power transfer element to create a resonant structure at a desired resonant frequency.

The electric vehicle power converter 238 may include, among other things, an AC/DC converter configured to convert power at an operating frequency back to DC power at a voltage level matched to the voltage level of an electric vehicle load 218 (e.g. a battery or battery pack). The electric vehicle power converter 238 may provide a converted power $P_L$ to charge the electric vehicle load 218.

The power supply 208, the base power converter 236, and the base power transfer element 204 may be stationary and located at a variety of locations as discussed above. The electric vehicle power converter 238, and the electric vehicle power transfer element 216 may be onboard the electric vehicle 112. In some implementations, both the electric vehicle power converter 238 and the electric vehicle power transfer element 216 are integrated in the electric vehicle load 118 (e.g., in a battery pack). The electric vehicle wireless power transfer system 214 may be configured to provide power wirelessly through the electric vehicle power transfer element 216 and the base power transfer element 204 to the base wireless power transfer system 202 to feed power back to the grid. In some implementations, each of the electric vehicle power transfer element 216 and the base power transfer element 204 may act as a transmit or a receive element based on the mode of operation.

While not shown in FIG. 2, the wireless power transfer system 200 may include a vehicle-side load disconnect unit (LDU) to safely disconnect the electric vehicle load 218 from the wireless power transfer system 200. In some implementations supporting reverse mode operation, an LDU may be provided on the base side (not shown) to safely disconnect the power supply 208 (acting as a load) from the wireless power transfer system 200. For example, in case of an emergency or system failure, the LDU may be triggered to disconnect the load from the wireless power transfer system 200. The LDU may be provided in addition to a battery management system (not shown) for managing charging to a battery, or it may be part of the battery management system.

Further, the electric vehicle wireless power transfer system 214 may include switching circuitry (not shown) for selectively connecting and disconnecting the electric vehicle power transfer element 216 to and from the electric vehicle power converter 238. Disconnecting the electric vehicle power transfer element 216 may suspend charging and may change the "load" as "seen" by the base wireless power transfer system 202 (acting as a power transmitter), which may be used to "cloak" the electric vehicle wireless power transfer system 214 (acting as the receiver) from the base wireless power transfer system 202. The load changes may be detected if the base wireless power transfer system 202 includes a load sensing circuit (not shown). Accordingly, the electric vehicle wireless power transfer system 214 (acting as a power transmitter) may include a mechanism for determining when the base power transfer element 204 connected to the base wireless power transfer system 202 (acting as a power receiver) is present in the near field of the electric vehicle power transfer element 216.

As described above, in operation, assuming energy transfer towards the vehicle 112 (battery 118), input power is provided from the power supply 208 such that the base power transfer element 204 generates an electromagnetic field for providing the energy transfer. The electromagnetic field in turn may induce power into the electric vehicle power transfer element 216 that is sufficient for storage or consumption by the electric vehicle 112. As described above, in some implementations, the base transmit circuit 206 and the electric vehicle receive circuit 222 are configured according to a mutual resonant relationship. In some implementations, the resonant frequencies of the base transmit circuit 206 and the electric vehicle receive circuit 222 are very close or substantially the same. Transmission losses between the input of the base wireless power transfer system 202 and the output of the electric vehicle power transfer system 214 may be reduced when the electric vehicle power transfer element 216 is located in the near field of the base power transfer element 204.

While not shown, the base wireless power transfer system 202 and the electric vehicle wireless power transfer system 214 may both include an oscillator, a driver circuit such as a power amplifier, a filter, and a matching circuit for efficient power transfer via the power transfer elements. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as "seen" at the base power transfer element 204 to the base power converter 236. In some implementations, the base power converter 236 may include solid state switching circuitry to generate a suitable power output as needed to charge an electric vehicle battery (e.g., the battery 118). Analogously, filter and matching circuits may be used to match the impedance as "seen" at the electric vehicle power transfer element 216 to the electric vehicle power converter 238. In some implementations, the electric vehicle power converter 238 may include a rectifier and switching circuitry to generate a suitable DC power output to charge the battery.

The electric vehicle power transfer element 216 and the base power transfer element 204 as described throughout the disclosed implementations may be referred to or configured as "loop" antennas, and more specifically, multi-turn loop antennas. The elements 204 and 216 may also be referred to herein or be configured as "magnetic" antennas. The term "power transfer element" refers to a component that may wirelessly output energy or wirelessly receive energy for coupling to another "power transfer element." The power transfer element may also be referred to as an "antenna" or a "coupler" of a type that is configured to wirelessly output or receive power. As used herein, the power transfer elements 204 and 216 are examples of "power transfer elements" of a type that are configured to wirelessly output, wirelessly receive, and/or wirelessly relay power. Loop (e.g., multi-turn loop) antennas may be configured to include an air core or a physical core such as a ferrite core. An air-core loop antenna may allow the placement of other components within the core area. Physical core antennas including ferromagnetic or ferrimagnetic materials may allow development of a stronger electromagnetic field and improved coupling.

Each of the base power transfer element 204 and the electric vehicle power transfer element 216 may be a "circular"-type coil (using a "circular" coil), a "Double D"-type coil (using a double coil arrangement), a "Solenoid"-type coil (using a solenoid coil wound around a core), a "Bipolar"-type coil (using a double coil arrangement with virtually zero coupling between the coils) or any other type of coil structure based on a single or multi-coil arrangement. In some implementations of the wireless power transfer system 200, different power transfer element types may be used for the base power transfer element 204 and the electric vehicle power transfer element 216.

Figure 3:
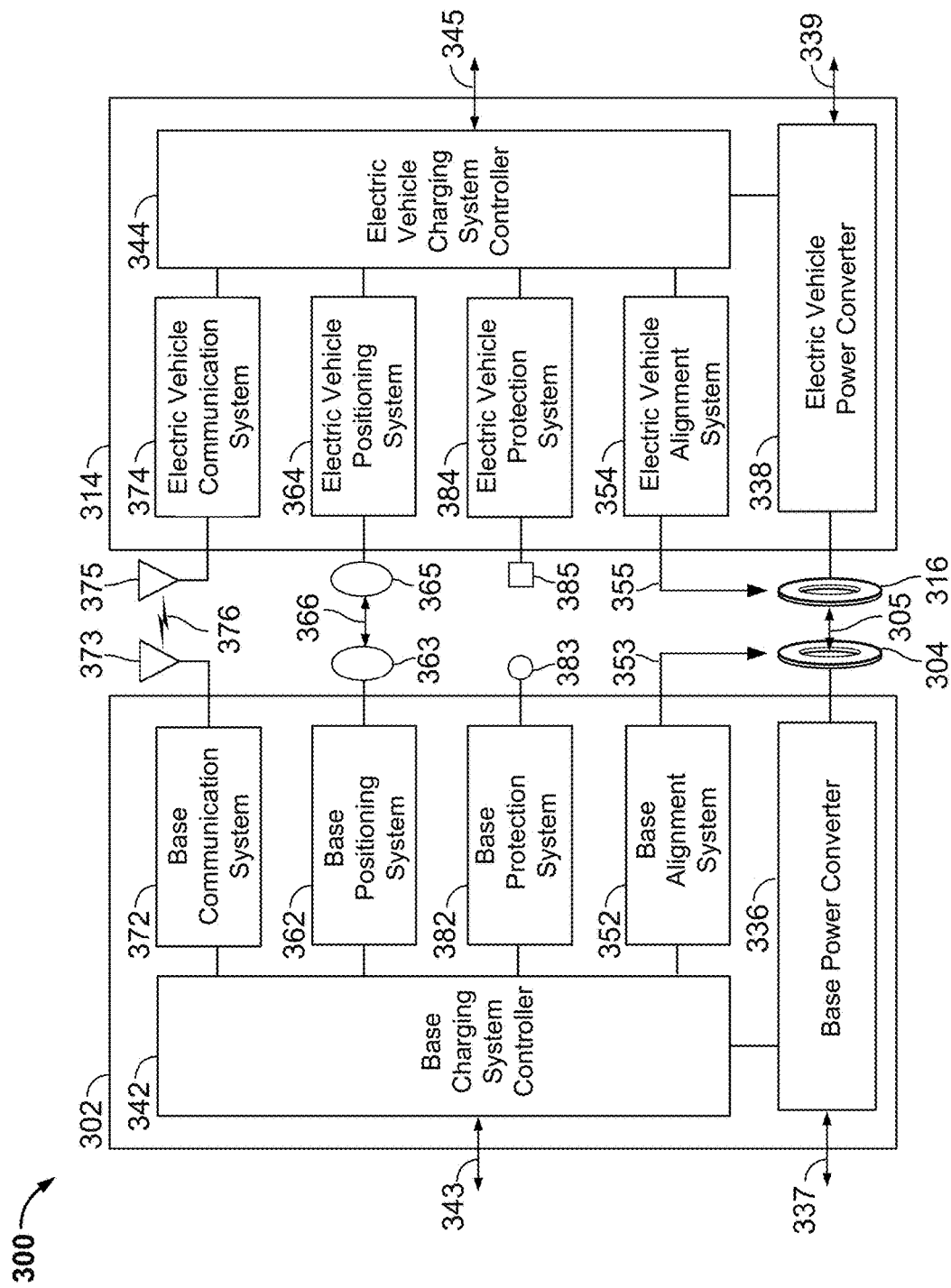
FIG. 3 is a functional block diagram of the primary side and the secondary side of the wireless electric vehicle charging system shown in FIG. 1.

FIG. 3 is another block diagram showing further exemplary components of a wireless charging system e.g., the wireless charging system 100 of FIG. 1, and/or of which the wireless power transfer system 200 of FIG. 2 may be part. The wireless charging system 300 may be split into a base charging system 302 and an electric vehicle charging system 314. One or more additional components may be included and/or one or more described components may not be included in the base charging system 302 and/or the electric vehicle charging system 314. The base charging system 302 may include a base power converter 336 (e.g., the base power converter 236 of FIG. 2) operationally connected to a base power transfer element 304 (e.g., the base power transfer element 204 of FIG. 2). Further, the base charging system 302 may include a base charging system controller 342 operationally connected to the base power converter 336 and to various ancillary systems such as a base communication system 372 operationally connected to a base communication antenna 373, a base positioning system 362 operationally connected to base positioning antennas 363, a base protection system 382 operationally connected to base protection sensors 383, and a base alignment system 352 operationally connected to a base alignment mechanism 353. One or more of the base alignment system 352, the base protection system 382, the base positioning system 362, and the base communication system 372 may be optional or may use one or more components of one or more of the systems 352, 362, 372, 382 (e.g., the base communication system 372 may provide communication via the base power transfer element 304 through modulation of the magnetic field used for power transfer).

Analogously, the electric vehicle charging system 314 may include an electric vehicle power converter 338 (e.g., the electric vehicle power converter 238 of FIG. 2) operationally connected to an electric vehicle power transfer element 316 (e.g., the electric vehicle element 216 of FIG. 2). Further, the electric vehicle charging system 314 may include an electric vehicle charging system controller 344 operationally connected to the electric vehicle power converter 338 and to various ancillary systems such as an electric vehicle communications system 374 operationally connected to an electric vehicle communication antenna 375, an electric vehicle positioning system 363 operationally connected to electric vehicle positioning antennas 365, an electric vehicle protection system 384 operationally connected to electric vehicle protection sensors 385, and an electric vehicle alignment system 354 operationally connected to an electric vehicle alignment mechanism 355. One or more of the electric vehicle alignment system 354, the electric vehicle protection system 384, the electric vehicle positioning system 364, and the electric vehicle communication system 374 may be optional or may use one or more components of one or more of the systems 354, 364, 374, 384 (e.g., the electric vehicle communication system 374 may receive communications via the electric vehicle power transfer element 304 through detection of modulation of the magnetic field used for power transfer). Any of the systems shown may be provided on one side but not the other (e.g., the electric vehicle protection system 384 may be absent while the base protection system 382 may be present and vice versa).

FIG. 3 also illustrates a wireless power link 305, a communication link 376, and a positioning link 366. Furthermore, FIG. 3 illustrates a base charging system power interface 337 and an electric vehicle charging system power interface 339 as well as a base charging system communication interface 343 and an electric vehicle charging system communication interface 345.

As described above with reference to FIG. 2, and assuming energy flow towards the electric vehicle 112, in FIG. 3 the base charging system power interface 337 may be configured to provide power to the base power converter 336 from a power source, such as an AC or DC power supply, e.g. the local power distribution center 130 as shown in FIG. 1. The base power converter 336 may receive AC or DC power via the base charging system power interface 337 to excite the base power transfer element 304. The electric vehicle power transfer element 316, when in the near-field coupling-mode region, may receive energy in the form of an oscillating signal. The electric vehicle power converter 338 converts the oscillating signal from the electric vehicle power transfer element 316 to a power signal suitable for charging the battery 118 via the electric vehicle charging system power interface 339.

In some implementations, the base wireless charging system 302 and all its subsystems and modules are centrally controlled by the base charging system controller 342 that handles and relays control and status information exchanged between the different subsystems. The base charging system controller 342 may include the base charging system communication interface 343 for communication with other systems (not shown) such as, for example, a computer, and a control center, or a smart power grid communications network. Analogously, the electric vehicle wireless charging system 314 may be centrally controlled by the electric vehicle charging system controller 344 that may include the electric vehicle charging system communication interface 345 for communication with other systems (not shown) such as, for example, a computer on board the vehicle 112, a battery management system that manages charge and discharge of the battery 118, other electronic systems within the vehicle 112, and remote electronic systems. The electric vehicle charging system controller 344 may communicate via the electric vehicle charging system communication interface 345 with a park assistance system by providing position data determined in the electric vehicle positioning system 364 and/or the base positioning system 362. In some implementations, the electric vehicle charging system controller 344 may communicate with a semi-automatic parking system configured to perform an automatic braking when the vehicle 112 has reached the final position for charging. In other implementations, the electric vehicle charging system controller 344 may communicate with an autonomous driving system configured to perform a largely automated parking that may provide higher parking accuracy, thus reducing or eliminating the need for mechanical alignment in any of the base wireless charging system 302 and the electric vehicle wireless charging system 314. Further, the electric vehicle charging system controller 344 may be configured to communicate with other electric vehicle onboard electronics. For example, electric vehicle charging system controller 344 may be configured to communicate with visual output devices (e.g., a dashboard display), acoustic/audio output devices (e.g., a buzzer, speakers) e.g., for purposes of guidance and alignment. The electric vehicle charging system controller 344 may be configured to receive commands from mechanical input devices (e.g., a keyboard, a touch screen, and pointing devices such as a joystick, a trackball, etc.), and from audio input devices (e.g., microphones of an electronic voice recognition system).

The base communication system 372 and the electric vehicle communication system 375 may include subsystems or circuits for specific application with separate communication channels. These communications channels may be separate physical channels or separate logical channels. In some implementations, communications are performed over the communication link 376 at radio frequencies (RF) using an RF communications standard such as Bluetooth®, Zigbee®, Dedicated Short Range Communications (DSRC), WLAN, etc. operating in an unlicensed band. In some other implementations, a cellular radio network is used. As non-limiting examples, the base alignment system 352 may communicate with the electric vehicle alignment system 354 through the communication link 376 to provide a feedback mechanism for more closely aligning the base power transfer element 304 with the electric vehicle power transfer element 316 via mechanical (kinematic) alignment. Similarly, the base positioning system 362 may communicate with the electric vehicle positioning system 364 through the communication link 376 to provide a feedback mechanism to guide an operator to a charging spot and to align the base power transfer element 304 with the electric vehicle power transfer element 316. In addition, there may be separate general-purpose communication links (e.g., channels) supported by the base communication system 372 and the electric vehicle communication system 374 for communicating other information between the base wireless charging system 302 and the electric vehicle wireless charging system 314 e.g., using an Ethernet over radio protocol. This information may include information about electric vehicle characteristics, battery characteristics and charging status, power capabilities and other characteristics of both the base wireless charging system 302 and the electric vehicle wireless charging system 314, as well as maintenance and diagnostic data for the electric vehicle 112. Some implementations may provide sufficient bandwidth for the allocation of value-add services to the vehicle user/owner.

In some implementations, the base positioning system 362 and/or the electric vehicle positioning system 364 are configured to determine the position of the electric vehicle 112 with respect to the charging spot by transmitting suitable signals via the positioning link 366. The positioning link 366 may be bi-directional, meaning that positioning signals may be emitted by the base positioning system 362 or the electric vehicle positioning system 364 or by both.

In some implementations relying on mechanical (kinematic) alignment by physically (mechanically) moving the base power transfer element 304 and/or the electric vehicle power transfer element 316, the base alignment system 352 and/or the electric vehicle alignment system controls the alignment of the base power transfer element 304 and/or the electric vehicle power transfer element 316 via the alignment mechanism 353 and/or the alignment mechanism 355, respectively. In some implementations, information on an alignment offset between the base power transfer element 304 and the electric vehicle power transfer element 316 is provided to the base alignment system 352 and/or to the electric vehicle alignment system 354 by the base positioning system 362 and/or the electric vehicle positioning system 364. In other implementations, information on an alignment offset is determined by the base alignment system 352 and/or by the electric vehicle alignment system 354.

Furthermore, the wireless charging system 300 may include detection and/or sensor systems to protect the wireless charging system 300. For example, the wireless charging system 300 may include the base protection system 382 and the electric vehicle protection system 384. These protection systems 382 and 384 may be configured to detect foreign objects in the space near and/or between the base power transfer element 304 and/or the electric vehicle power transfer element 316. As non-limiting examples, this may include detection of foreign (e.g., metallic) objects that may be heated up (e.g., through induction heating and/or hysteresis losses) (e.g., to critical temperatures) during the wireless charging operation, detection of hazardous events such as may be produced by metallic objects in connection with incandescent materials, and/or temperature monitoring of the base power transfer element 304 and/or the electric vehicle power transfer element 316 and/or of any other part of the wireless charging system 300 and the electric vehicle 112. Further, the protection systems 382 and 384 may be configured to detect living objects approaching the power transfer elements 304 and 316 beyond a radius. In some implementations, the protection systems 382 and 384 may be configured to detect objects based on mechanical alignment of the power transfer elements 304 and/or 316 e.g., mechanical alignment may be sensed as differing from an expected height and/or position based on a foreign object obstructing movement of a power transfer element.

The wireless charging system 300 may support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle wireless charging system 314, the wireless charging system 300 may use in-band signaling and/or out-of-band signaling. Out-of-band signaling may be performed via the communications link 376 e.g., using a RF technology as previously described. For in-band signaling, a low-depth amplitude or phase modulation of the wireless power carrier signal that may be transmitted on the wireless power link 305 may be used.

To enable wireless high power transfer, some implementations may be configured to transfer power at a frequency, as one example, in the range from 20-150 kHz. This low operating frequency may allow higher efficiency power conversion that may be achieved using solid state devices. In addition, there may be less coexistence issues with radio systems compared to other bands. However, other frequencies of operation in other ranges may also be used (e.g., frequencies in the 6.78 MHz or 13.56 MHz ISM bands).

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

Figure 4:
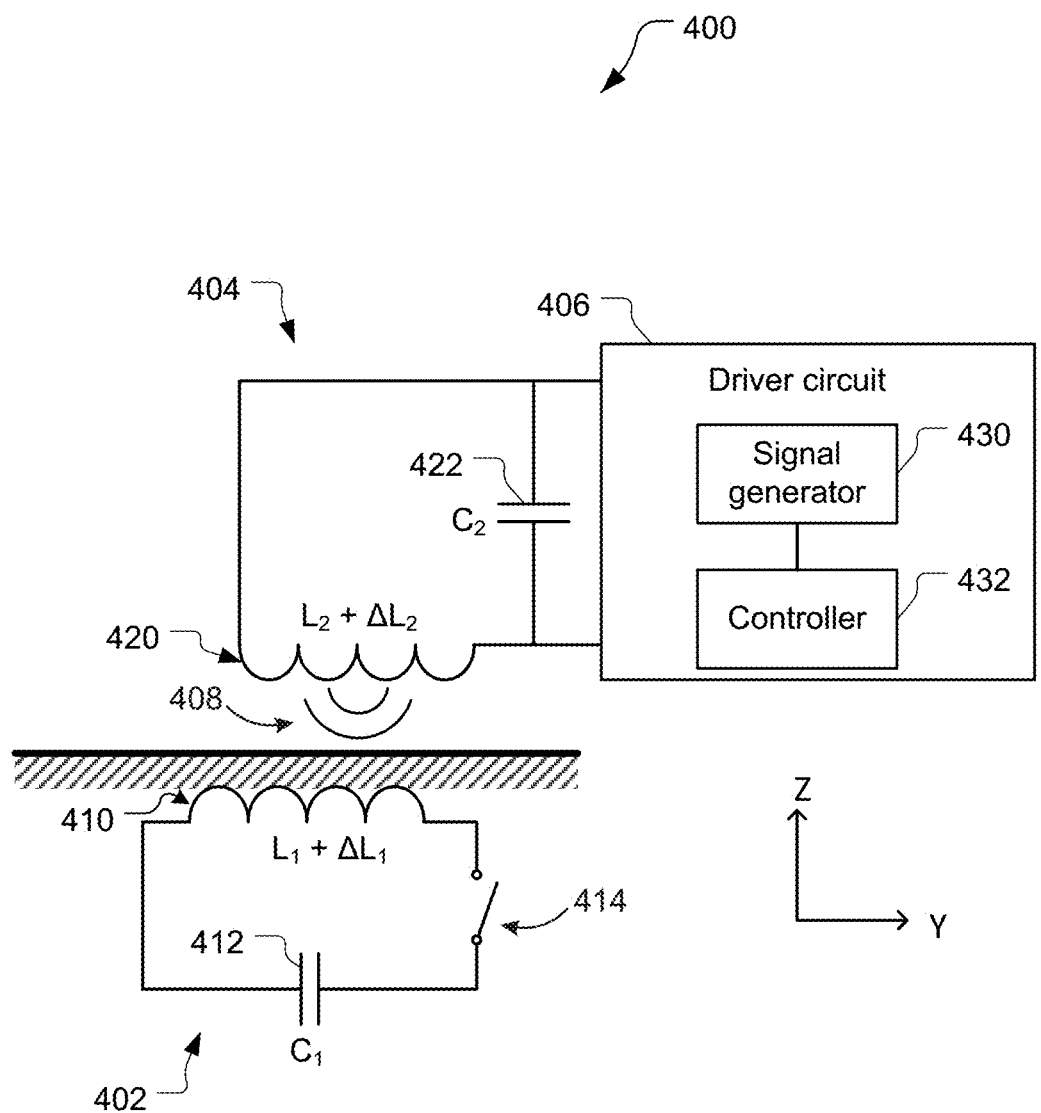
FIG. 4 is a schematic diagram of a subset of components of the wireless electric vehicle charging system shown in FIG. 2, comprising wireless charging system power transmission circuitry embedded a supporting structure and wireless charging system power reception circuitry disposed above the power transmission circuitry.

Referring to FIG. 4, a subset 400 of components of the wireless charging system 200 shown in FIG. 2 includes a base transmit/receive circuit 402, a mobile receive/transmit circuit 404, and a driver circuit 406. While here the subset 400 of components is part of an electric vehicle charging system, one or more of the components, e.g., the receive/transmit circuit 404, could be part of a different system such as a mobile power transfer system not in a vehicle. The base transmit/receive circuit 402 is configured to provide power wirelessly to the mobile receive/transmit circuit 404, e.g., to charge a battery and/or to power a motor and/or for another purpose. The mobile receive/transmit circuit 404 is also configured to provide power, e.g., in an alignment signal 408, wirelessly to the base transmit/receive circuit 402 in response to receiving power from the driver circuit 406.

Here, the alignment signal 408 is a magnetic field produced by a power transfer 420 and received by a power transfer element 410, and that induces a current and voltage in the power transfer element 410. The alignment signal 408 may not convey any information, e.g., coded information, but may be used to determine a level of coupling between the power transfer elements 420, 410, and hence a degree of alignment of the power transfer elements 420, 410.

The base transmit/receive circuit 402 includes the power transfer element 410, a capacitor 412, and a switch 414, with the combination of the power transfer element 410 and the capacitor 412 forming a resonant circuit. The power transfer element 410 may be, for example, a coil configured to produce a magnetic field in response to receiving a current, and to couple to a magnetic field (e.g., the alignment signal 408) to produce a voltage and/or a current. The power transfer element 410 has an inductive impedance of a natural inductance $L_1$ in the absence of significant outside influences. An inductance of the power transfer element 410 may be affected nearby objects such as the mobile receive/transmit circuit 404 and thus an inductance of the power transfer element 410 is equal to $L_1+\Delta L_1$, where $\Delta L_1$ is an inductance change (from the natural inductance $L_1$), e.g., induced by proximity of the power transfer element 410 to the mobile receive/transmit circuit 404 (e.g., a power transfer element of the mobile receive/transmit circuit 404). The switch 414 may be opened (as shown) to prevent power from being provided or received by the power transfer element 410 or closed to allow power to be transferred from, or received by, the power transfer element 410.

The mobile receive/transmit circuit 404 includes the power transfer element 420, and a capacitor 422, with the combination of the power transfer element 420 and the capacitor 422 forming a resonant circuit. The power transfer element 420 may be, for example, a coil configured to produce a magnetic field in response to receiving a current and to couple to a magnetic field to produce a voltage and/or a current. For example, the power transfer element 420 may couple to a magnetic field produced by the power transfer element 410 of the base transmit/receive circuit 402. In this way, the base transmit/receive circuit 402 can wirelessly provide charging power of several kilowatts or more of the electric vehicle wireless power transfer system 214 (FIG. 2). The power transfer element 420 has an inductive impedance of a natural inductance $L_2$ in the absence of significant outside influences. An inductance of the power transfer element 420 may be affected by nearby objects such as the base transmit/receive circuit 402 and thus an inductance of the power transfer element 420 is equal to $L_2+\Delta L_2$, where $\Delta L_2$ is an inductance change (from the natural inductance $L_2$), e.g., induced by proximity of the power transfer element 420 to the base transmit/receive circuit 402 (e.g., the power transfer element 410 of the base transmit/receive circuit 402).

The driver circuit 406 includes a signal generator 430 and a controller 432 and is configured to provide an alignment signal to the power transfer element 420. The power transfer element 420 may receive power wirelessly from the power transfer element 410 as discussed above, and may also provide a signal, e.g., a magnetic field, to the power transfer element 410. The power provided by the power transfer element 420 may induce a voltage/current in the power transfer element 410, or at least affect a mutual inductance between the power transfer elements 410, 420 and thus affect an inductance of the power transfer element 420 and a resonant frequency of the mobile receive/transmit circuit 404. The power of the alignment signal provided by the power transfer element 420 may be provided by a battery of the electric vehicle wireless power transfer system 214 that may be charged from power wirelessly received from the power transfer element 410 by the power transfer element 420. The signal generator 430 may include, or be coupled to, an energy source such as an energy storage device (e.g., the load 218, such as a battery or battery pack) that can be used to store energy and from which energy can be drawn. The controller 432 (and/or other controller(s) discussed herein) may include a processor and a non-transitory, processor-readable memory that stores processor-readable instructions configured to cause the processor to perform functions discussed herein. The controller 432 is configured to cause the signal generator 430 to produce an alignment signal and to provide the alignment signal to the mobile receive/transmit circuit 404 and thus to the power transfer element 420. The controller 432 may cause the signal generator 430 to produce the alignment signal with different frequencies, e.g., to sweep the frequency of the alignment signal across a range of frequencies. Alternatively, the signal generator 430 may, combined with the mobile receive/transmit circuit 404, be a self-resonant circuit and the controller 432 may be configured to actuate the signal generator 430 and the signal generator 430 will self-adjust the frequency of the alignment signal such that the alignment signal frequency will be the resonant frequency of the mobile receive/transmit circuit 404.

The driver circuit 406 is further configured to determine a resonant frequency of the mobile receive/transmit circuit 404. As discussed above, the proximity of the power transfer element 410 to the power transfer element 420 affects the inductance of the power transfer element 420 and thus the resonant frequency of the mobile receive/transmit circuit 404. This resonant frequency may be determined by inducing the alignment signal and using the alignment signal to determine the resonant frequency of the mobile receive/transmit circuit 404, e.g., by having the signal generator 430 self-adjust to resonance, or sweeping the alignment signal to find a resonant frequency. For example, if the controller 432 is configured to cause the signal generator to sweep the frequency of the alignment signal across a range of frequencies, then the controller 432 may be configured to monitor a voltage across the power transfer element 420. The controller 432 may determine a frequency at which the voltage across the power transfer element peaks, and identify this frequency as the resonant frequency of the mobile receive/transmit circuit 404. Alternatively, if the signal generator 430 is a self-regulating circuit that combined with the mobile receive/transmit circuit 404 is a self-resonant circuit, then the controller 432 may monitor the signal generator 432 to determine the resonant frequency of the mobile receive/transmit circuit 404.

Figure 5:
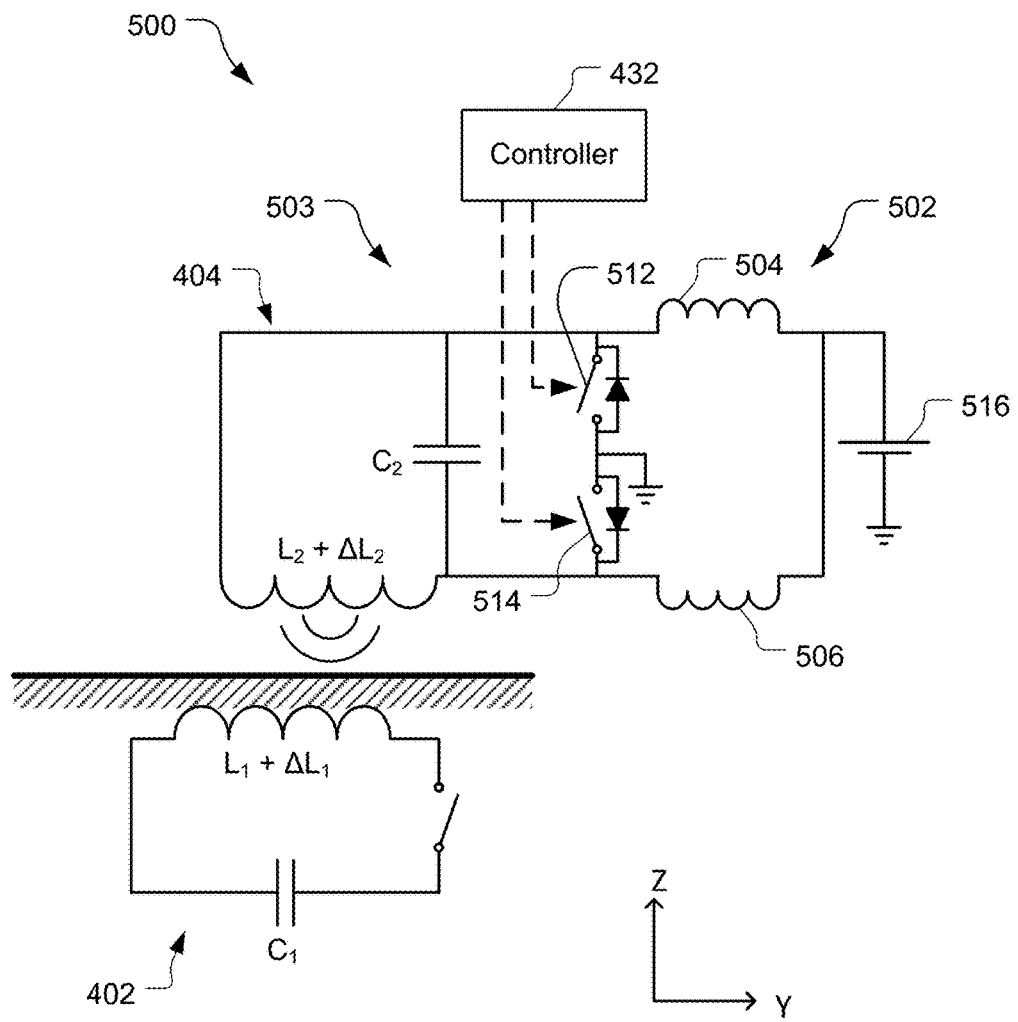
FIG. 5 is a schematic diagram of another subset of components of the wireless electric vehicle charging system shown in FIG. 2.

Referring also to FIG. 5, a subset 500 of components of the wireless charging system 200 shown in FIG. 2 is an example of the subset 400 and includes a self-regulating circuit 502 as the signal generator 430. The self-regulating circuit 502 in combination with the mobile receive/transmit circuit 404 is a self-resonant circuit 503. The self-regulating circuit 502 includes inductors 504, 506, e.g., with high inductance values, and switches 512, 514 (with appropriate feedback paths) and is configured to transform a DC (direct current) input voltage from a DC voltage source 516 to a pseudo current source with a small current ripple. As the inductances of the inductors 504, 506 will be different, e.g., due to manufacturing variance and/or by design, one of two switches 512, 514, e.g., the switch 512, will be biased closed initially. As current flows, the biasing changes such that eventually the switch 514 will be biased closed and the switch 512 will open. Which of the switches 512, 514 is closed and which is open will continue to alternate, and will do so at a frequency that changes, quickly (e.g., within about five resonant cycles) settling at the resonant frequency of the mobile receive/transmit circuit 404. The controller 432 may be configured and coupled to monitor status of one or more of the switches 512, 514 (as shown in FIG. 5, of both of the switches 512, 514) to determine a frequency of the switch(es) cycling on and off (open and closed). Also or alternatively, the controller 432 may be configured and coupled to monitor voltage and/or current in the mobile receive/transmit circuit 404 to determine a frequency. The determined frequency (of the switch(es) and/or the mobile receive/transmit circuit 404) will be the resonant frequency of the mobile receive/transmit circuit 404.

Figure 6:
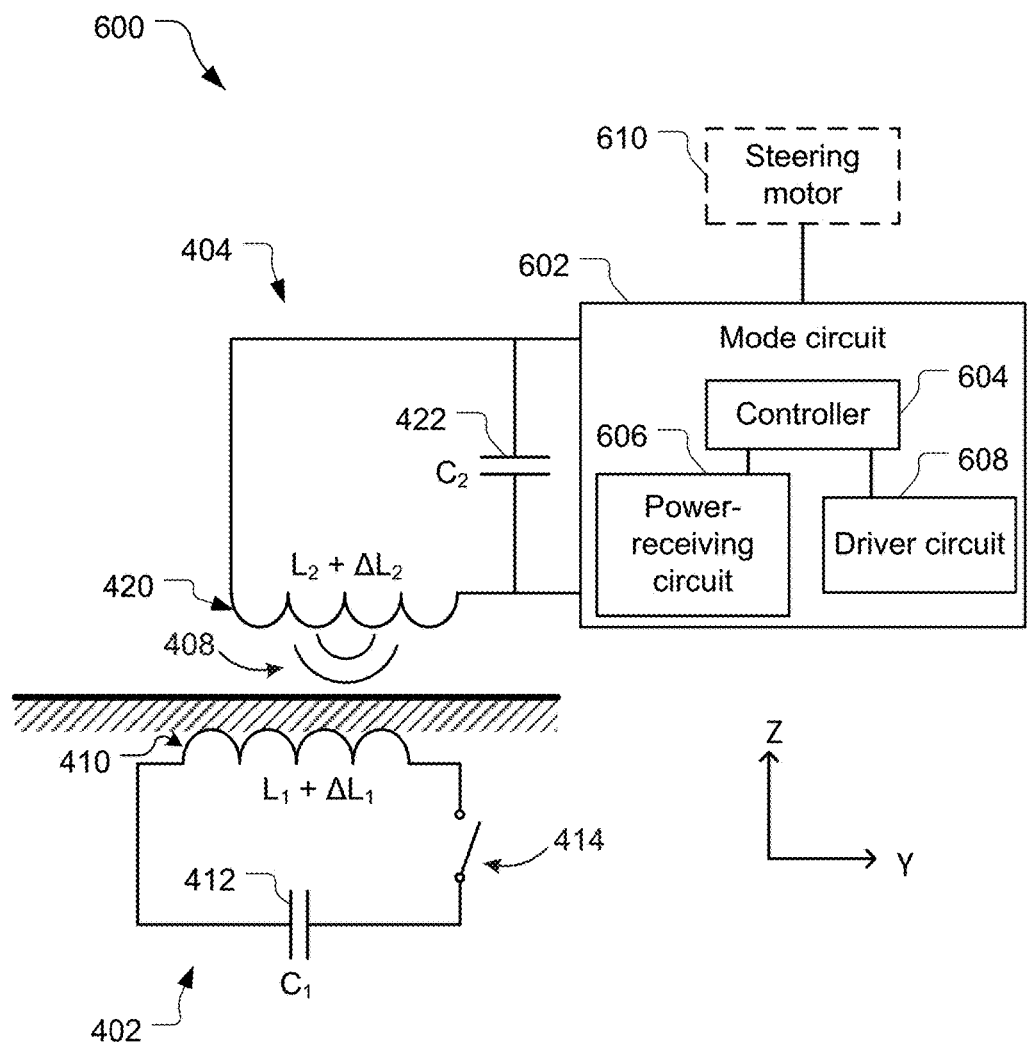
FIG. 6 is a schematic diagram of subset of components of the wireless electric vehicle charging system shown in FIG. 2.

Referring also to FIG. 6, a subset 600 of components of the wireless charging system 200 shown in FIG. 2 includes a mode circuit that includes a controller 604, a power-receiving circuit 606, and a driver circuit 608. The controller 604 is communicatively coupled to the power-receiving circuit 606 and the driver circuit 608. The controller 604 is configured to control which of the power-receiving circuit 606 and the driver circuit 608 is in use at any given time, e.g., to charge a battery and/or to produce an alignment signal, although the circuit 606 and the driver circuit 608 may be implemented by the same physical circuit. The power-receiving circuit 606 may comprise the electric vehicle power converter 238 and the load 218 shown in FIG. 2. The driver circuit 608 may comprise the driver circuit 406 shown in FIG. 4, and the controller 432 may be implemented by the controller 604, or by a separate controller, or by a combination of the controller 604 and separate circuitry. Further, the controller 604 may be configured to implement functions other than those of the mode circuit 602 and/or the controller 432, e.g., may be part of a controller that serves a broader purpose such as for an entire vehicle. For example, the controller 604 may be a central controller of a vehicle and/or may be configured to cause the vehicle to be steered, e.g., to provide steering indications to a steering motor 610 that is optional in the subset 600, that may be used in a vehicle configuration, and that is configured to steer a vehicle in response to the steering indications. The steering indications may be indications of steering adjustments to be made and/or may be indications of lateral alignment/misalignment that the steering motor converts into steering adjustments (i.e., amounts of change to one or more wheels of the vehicle).

Figure 7:
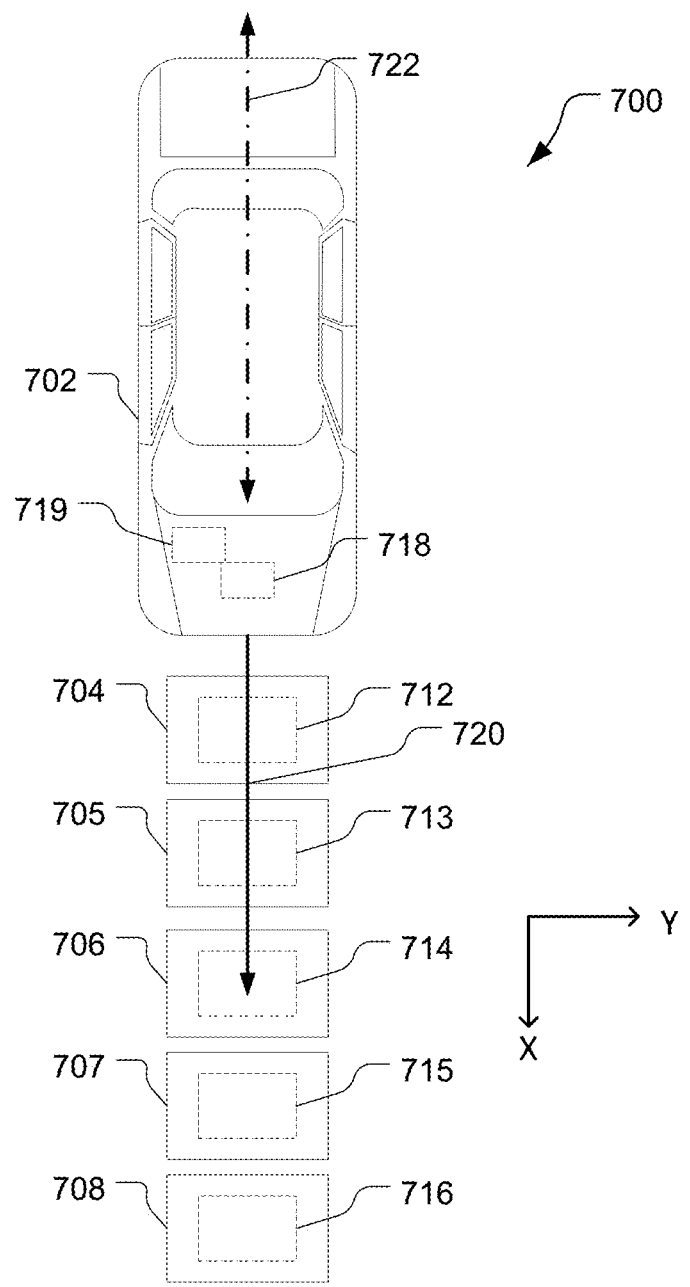
FIG. 7 is a top view of an example of the wireless electric vehicle charging system shown in FIG. 2.

Referring also to FIG. 7, a charging environment 700 includes a vehicle 702 and base wireless power transfer systems 704, 705, 706, 707, 708. In this example, the base wireless power transfer systems 704-708 comprise multiple base wireless power transfer systems embedded in a road for a dynamic charging environment while the vehicle 702 is in motion, or for a static charging environment, e.g., when the vehicle 702 is parked if one or more of the base wireless power transfer systems 704-708 is embedded in a parking area of the road. Other example charging environments may be used, such as one or more of the base wireless power transfer systems 704-708 disposed in a parking spot for a static charging environment while the vehicle 702 is parked, and a dynamic charging environment if charging begins before the vehicle 702 stops and/or after the vehicle 702 begins moving. As shown in FIG. 7, a direction of travel 720 of the vehicle 702, and thus a depth alignment of the power transfer element 718 to the power transfer elements 712, 713, 714, 715, 716, is along an x-direction. Lateral alignment of the base wireless power transfer systems 704-708 to the vehicle 702 (and in particular of power transfer elements 712-716 of the base wireless power transfer systems 704-708 relative to a power transfer element 718 of the vehicle 702) is along a y-direction (as also illustrated in FIGS. 4-6). A lateral misalignment of the power transfer element 718 relative to the power transfer elements 712-716 is a side-to-side misalignment or azimuthal misalignment, i.e., transverse to an expected direction of travel of the vehicle 702. Here, the lateral misalignment is transverse to the direction of travel 720 and a length of the vehicle 702 as the direction of travel 720 as shown is collinear with centers of the power transfer elements 712-716 and collinear with a length of the vehicle 702 extending through a centerline 722 of the vehicle 702. The direction of travel 720 may depart from this direction and thus the lateral misalignment may not be exactly transverse to the direction of travel 720 or the length of the vehicle 702, but substantially transverse to (within 10° of) the direction of travel 720, or the length, of the vehicle 702. Further, the lateral misalignment may be relative to centers of two or more, but less than all, of the power transfer elements 712-716. For example, the lateral misalignment may be relative to centers of adjacent ones of the power transfer elements 712-716.

Figure 8:
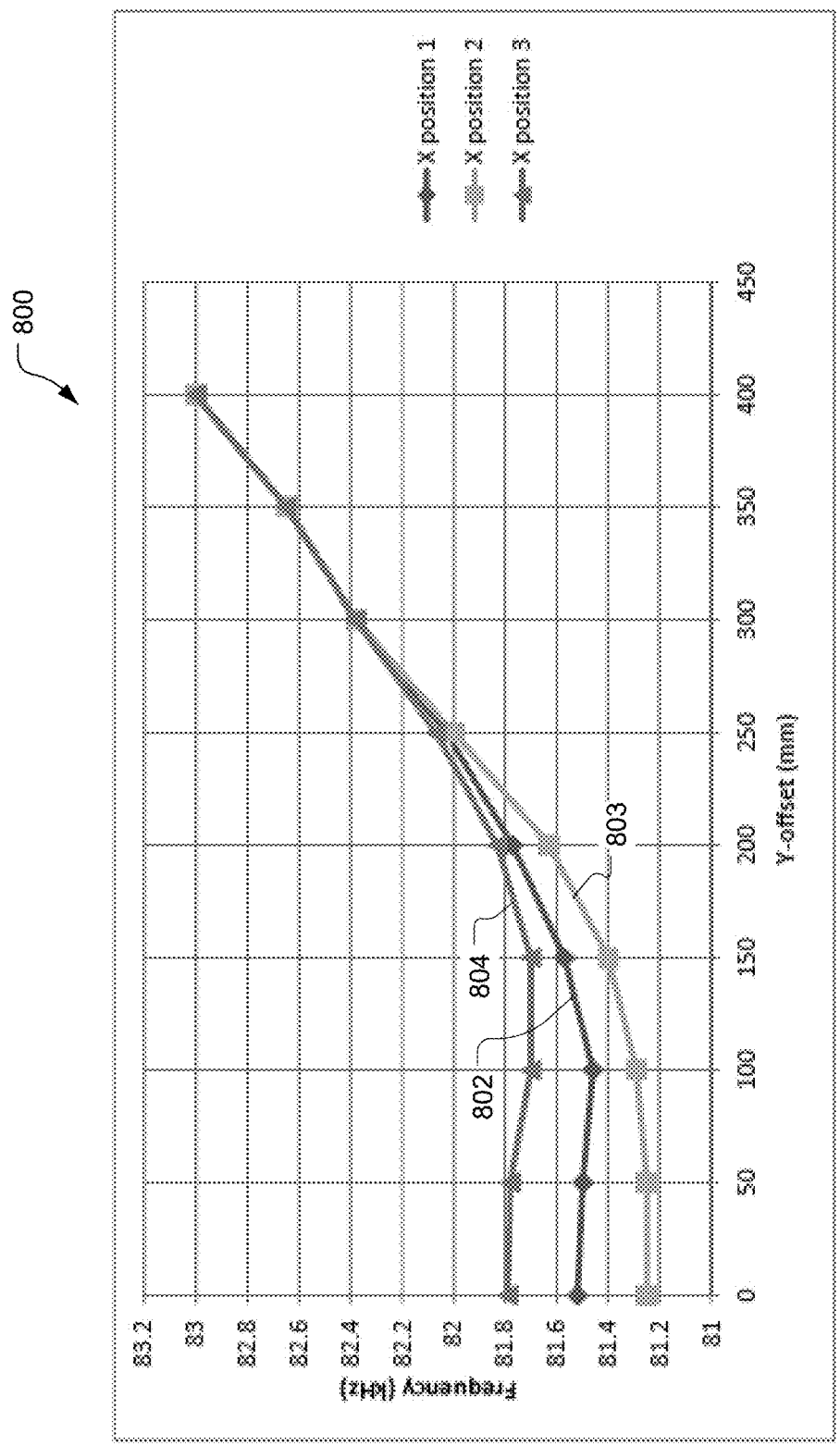
FIG. 8 is a graph of resonant frequencies of a mobile receive/transmit circuit shown in FIG. 4 as a function of lateral offset of power transfer elements shown in FIG. 4 for different depth offsets of the power transfer elements, with a switch associated with a primary side shown in FIG. 4 being open.
Figure 9:
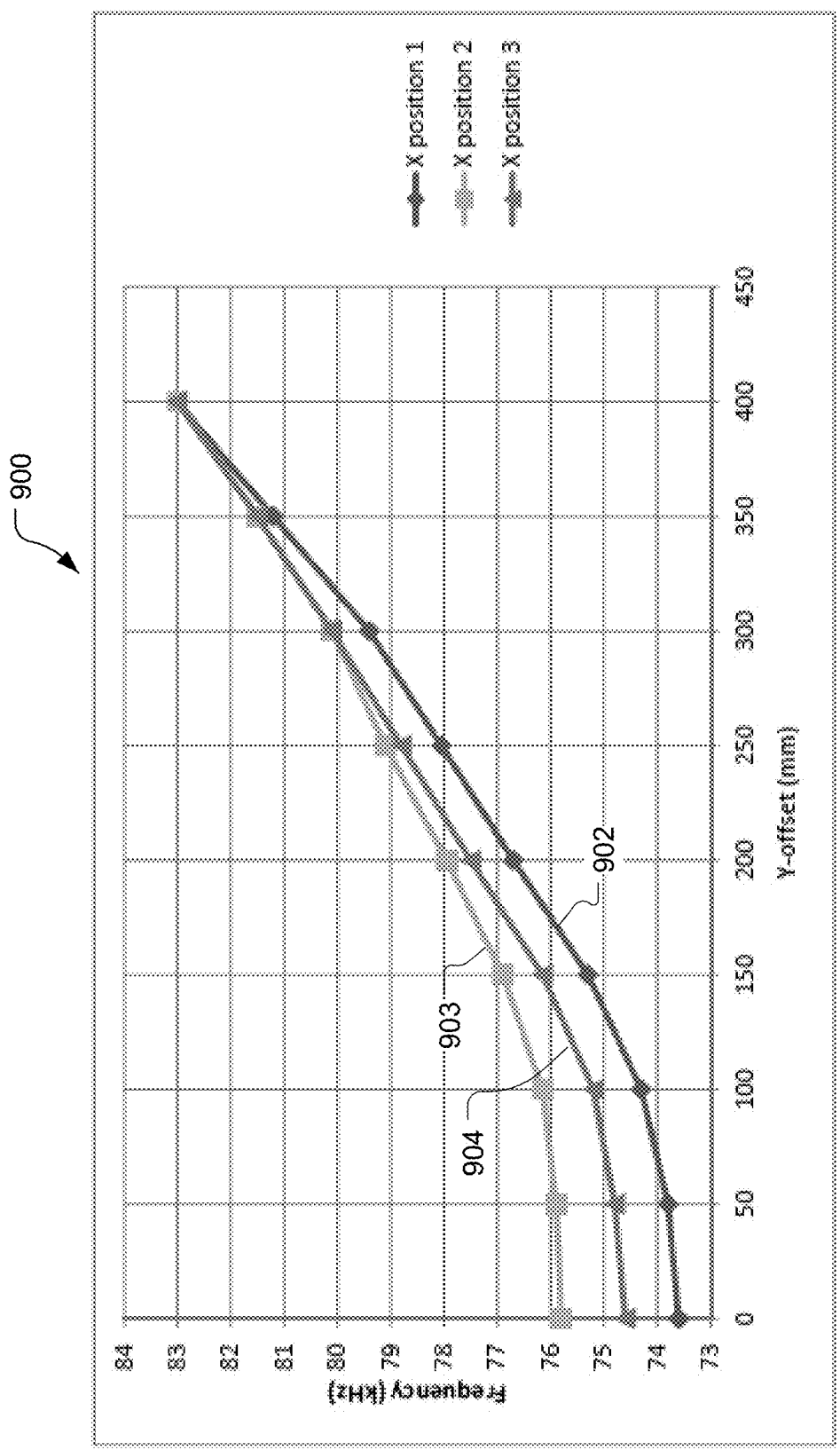
FIG. 9 is a graph of resonant frequencies of the mobile receive/transmit circuit shown in FIG. 4 as a function of lateral offset of power transfer elements shown in FIG. 4 for different depth offsets of the power transfer elements, with the switch associated with the primary side shown in FIG. 4 being closed.

Referring to FIGS. 8-9, with further reference to FIGS. 4-6 and the discussion above, the resonant frequency of the power transfer element 420 varies as shown with lateral offset (y-offset) and depth (x-position) relative to each of the power transfer elements 712-716 of the base wireless power transfer systems 704-708. The inductance of the power transfer element 420, and thus the resonant frequency of the mobile receive/transmit circuit 404, is affected by nearby objects, including the power transfer element 410. What effect the power transfer element 410 has on the inductance of the power transfer element 420 is a function of how close the power transfer elements 410, 420 are to each other and the amount of overlap of the power transfer elements 410, 420 (i.e., how much the areas of the power transfer elements 410, 420 overlap). Thus, as the vehicle 112 moves, and thus the power transfer element 420 moves relative to one or more power transfer elements 410, the inductance of the power transfer element 420, and thus the resonant frequency of the mobile receive/transmit circuit 404 varies. A graph 800 shows resonant frequencies of the mobile receive/transmit circuit 404 with the switch 414 open and a graph 900 shows resonant frequencies of the mobile receive/transmit circuit 404 with the switch 414 closed for different x-offset and y-offset values corresponding to different amounts of overlap of the power transfer elements 410, 420. The base wireless power transfer system 202 may communicate to the electric vehicle wireless power transfer system 214 whether the switch 414 is open or closed, or the controller 432 may infer the state of the switch 414 from the graphs 800, 900 and the determined values of the resonant frequency. Plots 802, 803, 804 and 902, 903, 904 show the resonant frequencies of the mobile receive/transmit circuit 404 for varying lateral offsets with the power transfer element 718 at a first depth offset, a second depth offset, and a third depth offset, respectively. The first depth offset is zero, with a center of the power transfer element 718 at the same x-direction depth as one of the power transfer elements 712-716. The second and third depth offsets are with the power transfer element 718 being ⅔ and ⅘, respectively, overlapping with one of the power transfer elements 712-716. As the power transfer element 718 moves across each of the power transfer elements 712-716, the power transfer element 718 will be offset by each of the depth offsets twice such that the resonant frequency of the mobile receive/transmit circuit 404 will vary between the three plots 802-804 or 902-904 twice. Thus, assuming no change in lateral offset, as the vehicle 702 moves over, and changes depth relative to, each of the power transfer elements 712-716 between the first, second, and third depth offsets, the resonant frequency will move vertically between the respective plots 802-804 or 902-904 twice per each of the power transfer elements 712-716. In the case of the environment 700, with multiple base power transfer elements, the vehicle 702 will move between the three depth offsets for multiple base power transfer elements, and thus the resonant frequency will move vertically back and forth between the plots 803, 804 or 902, 903. There may be a maximum lateral offset that is acceptable for charging, e.g., to reduce a risk of unintentionally radiating objects. For example, providing charging power to the power transfer elements 712-716 may only be enable while the lateral offset of the power transfer element 718 relative to the power transfer elements 712-716 is 200 mm or less.

The controller 432 is configured to determine the lateral offset by analyzing the resonant frequency of the mobile receive/transmit circuit 404. For example, the controller 432 may determine the lateral offset by determining the range of resonant frequencies that the resonant frequency of the mobile receive/transmit circuit 404 cycles between, finding this range as defined by the plots 802-804 or 902-904 (depending on whether the switch 414 is open or closed), and identifying the corresponding y-offset as the lateral offset. That is, the controller 432 determines an upper bound and a lower bound of the resonant frequency of the mobile receive/transmit circuit 404 due to the power transfer element 718 moving over one or more of the power transfer elements 712-716, locates the combination of this upper bound and this lower bound for a single y-offset in the graph 800 or the graph 900, and identifies this y-offset as the lateral offset of the power transfer element 718 relative to the one or more of the power transfer elements 712-716. The controller 432 may be configured to analyze spot measurements of the resonant frequency over time against the graph 800 or the graph 900. The controller 432 may be configured to analyze a graph, similar to the graph 800 or the graph 900, that corresponds to a vertical, z, offset of the power transfer element 718 and the power transfer elements 712-716. The vertical offset may be determined using known means such as a laser or ultrasonic distance meter, and/or monitoring vehicle suspension travel. Also or alternatively, to determine the lateral offset, the controller 432 could analyze an average resonant frequency and compare this with known average resonant frequencies for different y offsets for an appropriate z offset and/or compare the average resonant frequency against a maximum resonant frequency and/or a minimum resonant frequency for an appropriate z offset. If the z offset is unknown, the range of resonant frequency detected may be used to determine y offset, or at least to determine whether y-offset correction is in order. By analyzing the resonant frequency of the mobile receive/transmit circuit 404 to determine the lateral offset, communication between the base wireless power transfer system 202 and the electric vehicle wireless power transfer system 214 may be reduced or eliminated, at least for determining the lateral offset. This may be advantageous for adjusting offset while the vehicle 112 is being driven as performing a coupling check and communicating offset determined from the coupling check may be too time consuming to provide feedback or at least useful, timely feedback.

Various techniques may be used to adjust the y offset and/or determine a polarity (e.g., positive-y (left) or negative-y (right) of centerline) to go with the y offset magnitude. For example, the range of resonant frequency will vary more as the y offset decreases. Thus, the controller 432 may be configured to adjust the y offset (by steering the vehicle) and monitor the range of the resonant frequency, and then adjust the y offset as appropriate to maximize the range of the resonant frequency (e.g., continuing to steer the vehicle in the same direction if the range of resonant frequency increases, and steering the vehicle in the opposite direction if the range of resonant frequency decreases). Also or alternatively, a power transfer element 719, e.g., in addition to the power transfer element 718, may be provided that is offset from the power transfer element 718 relative to the centerline 722. The power transfer element 719 is disposed relative to the power transfer element 718 such that interference between the power transfer elements 718, 719 is acceptably low. The resonant frequency of each of the power transfer elements 718, 719 may be determined, and from these frequencies the y-offset magnitude for each of the power transfer elements 718, 719 determined (e.g., using the graph 800 and/or the graph 900). These y-offset magnitudes and the positions of the power transfer elements 718, 719 relative to the centerline 722 may be used to determine the polarity of they offset relative to the centerline 722. For example, if the power transfer element 719 is offset −20 mm relative to the power transfer element 718, and the y-offset magnitudes are found to be 150 mm for the power transfer element 718 and 130 mm for the power transfer element 719, then the offset polarity is positive, i.e., the power transfer element 718 is 150 mm in the positive-y direction offset from the centerline 722.

Figure 10:
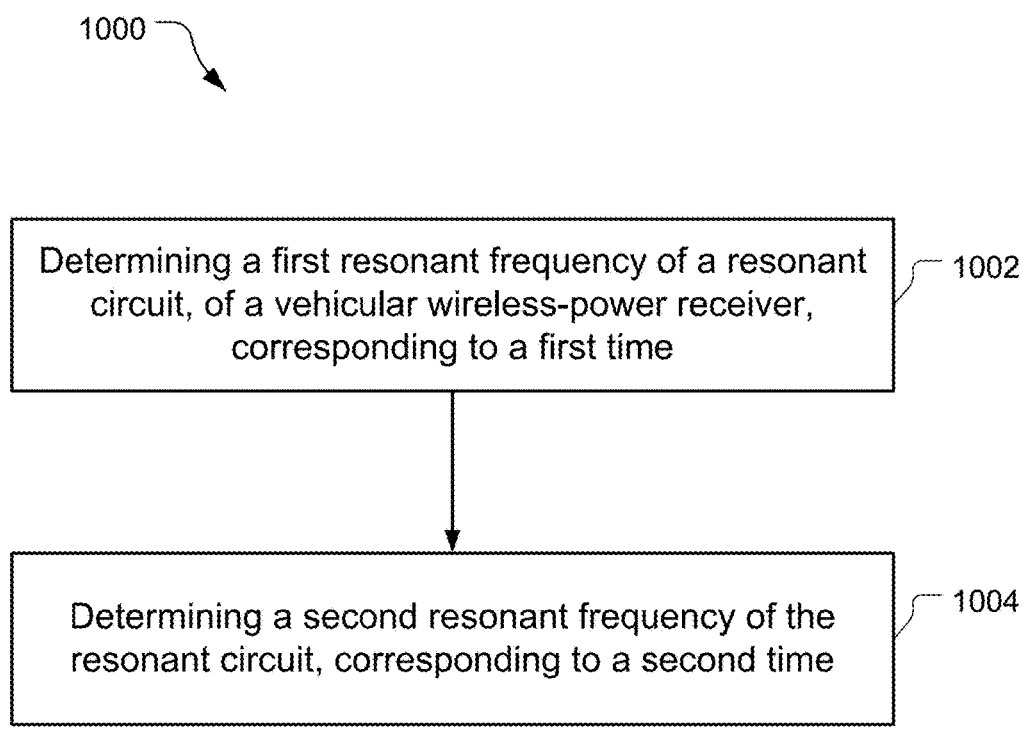
FIG. 10 is a block flow diagram of a method of operating a vehicular wireless-power receiver.

Referring to FIG. 10, with further reference to FIGS. 1-9, a method 1000 of operating a vehicular wireless-power receiver includes the stages shown. The method 1000 is, however, an example only and not limiting. The method 1000 may be altered, e.g., by having stages added, removed, rearranged, combined, performed concurrently, and/or having single stages split into multiple stages.

At stage 1002, the method 1000 includes determining a first resonant frequency of a resonant circuit, of a vehicular wireless-power receiver, corresponding to a first time. At the first time, a vehicle containing the vehicular wireless-power receiver will be disposed at a first longitudinal (depth) offset from a power transmitter, with the first longitudinal offset being relative to a length of the vehicle. For example, at the first time, a center of the power transfer element 718 of the vehicle 702 may be offset along the x-direction shown in FIG. 7 by a first amount. This first amount may correspond to x position 1 indicated in FIGS. 8-9. In this case, the resonant frequency of the mobile receive/transmit circuit 404 will lie along the plot 802 if the switch 414 is open or along the plot 902 if the switch 414 is closed. The controller 432 may determine the resonant frequency of the resonant circuit corresponding to the first time, i.e., determine what the resonant frequency at the first time is, regardless of when the controller 432 determines the resonant frequency.

The controller 432 determines the resonant frequency of the mobile receive/transmit circuit 404, e.g., by causing the signal generator 430 to produce an alignment signal that the power transfer element 420 emits and determining the resonant frequency of the mobile receive/transmit circuit 404 based on the alignment signal. For example, the controller 432 may determine the resonant frequency by monitoring the cycle time of one or more of the switches 512, 514 of the self-resonant circuit. As another example, the controller 432 may determine the resonant frequency by causing the signal generator 430 to sweep the frequency of the alignment signal across multiple frequencies and determining at which of the multiple frequencies a voltage across, or a current through, the power transfer element 420 is highest (e.g., spikes). The controller 432 may determine the resonant frequency by another appropriate method.

At stage 1004, the method 1000 includes determining a second resonant frequency of the resonant circuit, corresponding to a second time. At the second time, a vehicle containing the vehicular wireless-power receiver will be disposed at a second longitudinal (depth) offset from the power transmitter, with the second longitudinal offset being relative to a length of the vehicle and being different from the first longitudinal offset. For example, at the second time, a center of the power transfer element 718 of the vehicle 702 may be offset along the x-direction shown in FIG. 7 by a second amount that is different from the first amount discussed above. This second amount may correspond to x position 2 (or x position 3) indicated in FIGS. 8-9. For example, with the second amount corresponding to x position 2, the resonant frequency of the mobile receive/transmit circuit 404 will lie along the plot 803 if the switch 414 is open or along the plot 903 if the switch 414 is closed. The controller 432 can determine the resonant frequency of the resonant circuit in any of the manners discussed above with respect to stage 1002.

The method 1000 may include one or more further stages. For example, the method 1000 may further comprise determining an offset of the power transfer element relative to a power transmitter based on the first resonant frequency and the second resonant frequency. For example, the controller 604 may determine a lateral offset by mapping the resonant frequencies determined in the stages 1002, 1004, and one or more other determined resonant frequencies to the plot 800 or the plot 900 to determine a corresponding lateral offset of the power transfer element 718 relative to one or more of the power transfer elements 712-716. The offset of the power transfer element relative to the power transmitter may be a lateral misalignment, of the power transfer element relative to the power transmitter, substantially transverse to at least one of a direction of travel of a vehicle containing the vehicular wireless-power receiver or a line through centers of multiple power transmitters. For example, the offset may be a lateral misalignment in the y-direction shown in FIGS. 4-7 with a direction of travel of the vehicle 702 being along, or close to, the direction of travel 720 shown in FIG. 7. As another example of a further stage, the method 1000 may include steering a vehicle, based on the lateral misalignment, to reduce the lateral misalignment. For example, the controller 604 may send indications to the steering motor 610 in response to which the steering motor turns one or more wheels of the vehicle 702 to attempt to reduce the lateral misalignment. The indications sent by the controller 604 may be, for example, instructions to turn the wheel(s) or may be indications of the lateral misalignment that the steering motor converts into commands to turn the wheel(s).

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

The term "exemplary" indicates that something is an example and does not imply that the thing (e.g., a feature or embodiment) is better than or preferred over another thing. Thus, an "exemplary embodiment" may not be the best known embodiment, and may not be preferred over another embodiment, but the exemplary embodiment is an example of an embodiment that may be used.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific requirements. For example, customized hardware might also be used. Further, connection to other computing devices such as network input/output devices may be employed.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure.

Components, functional or otherwise, shown in the figures and/or discussed herein as being coupled (e.g., communicatively coupled), connected, or communicating with each other are operably coupled. That is, they may be directly or indirectly, wired and/or wirelessly, connected to enable signal flow between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A wireless-power receiver comprising:
a resonant circuit including a power transfer element, the resonant circuit having a resonant frequency;
a power-receiving circuit coupled to the resonant circuit; and
a controller, coupled to the resonant circuit, configured to:
determine a first resonant frequency of the resonant circuit corresponding to a first time;
determine a second resonant frequency of the resonant circuit corresponding to a second time; and
determine an offset of the power transfer element relative to a power transmitter based on the first resonant frequency and the second resonant frequency.

2. The wireless-power receiver of claim 1, wherein the offset of the power transfer element relative to the power transmitter is a lateral misalignment, of the power transfer element relative to the power transmitter, substantially transverse to a length of a vehicle containing the wireless-power receiver.

3. The wireless-power receiver of claim 2, wherein the controller is configured to cause the vehicle to be steered, based on the lateral misalignment, to reduce the lateral misalignment.

4. The wireless-power receiver of claim 1, wherein the controller is configured to determine the offset of the power transfer element relative to a power transmitter based on a range of resonant frequencies from the first resonant frequency to the second resonant frequency.

5. The wireless-power receiver of claim 4, wherein the controller is configured to determine the offset of the power transfer element relative to the power transmitter by comparing the range of resonant frequencies to one of a plurality of relationships between ranges of resonant frequencies of the resonant circuit and offsets, the controller being further configured to select which of the plurality of relationships to compare to the range of resonant frequencies based on an indication received from the power transmitter.

6. The wireless-power receiver of claim 1, wherein the controller is configured to cause the resonant circuit to use energy from an energy source to emit a signal from the power transfer element at the first time and at the second time.

7. The wireless-power receiver of claim 6, wherein the resonant circuit comprises a self-resonant circuit, and wherein to determine the first resonant frequency the controller is configured to determine a frequency of the signal emitted from the power transfer element at the first time.

8. The wireless-power receiver of claim 7, wherein to determine the first resonant frequency the controller is configured to determine a cycle time of at least one switch of the self-resonant circuit.

9. The wireless-power receiver of claim 6, wherein the controller is configured to cause the power transfer element to emit the signal with each of a plurality of different frequencies, and wherein to determine each of the first resonant frequency and the second resonant frequency the controller is configured to determine at which of the plurality of different frequencies there is at least one of a highest amount of current through, or voltage across, the power transfer element.

10. The wireless-power receiver of claim 6, wherein the power-receiving circuit is coupled to the energy source and configured to provide energy received from the power transmitter to the energy source to charge the energy source.

11. The wireless-power receiver of claim 6, wherein the controller is configured to cause the resonant circuit to emit, as the signal, a magnetic field to transfer energy to the power transmitter.

12. A method of operating a wireless-power receiver, the method comprising:
  determining a first resonant frequency of a resonant circuit, of the wireless-power receiver, corresponding to a first time at which the wireless-power receiver is disposed at a first longitudinal offset from a power transmitter, the first longitudinal offset being relative to a length of a device containing the wireless-power receiver;
  determining a second resonant frequency of the resonant circuit, corresponding to a second time at which the wireless-power receiver is disposed at a second longitudinal offset from the power transmitter, the second longitudinal offset being relative to the length of the device containing the wireless-power receiver, and the first longitudinal offset being different from the second longitudinal offset; and
  determining a lateral misalignment of the wireless-power receiver relative to a wireless-power transmitter based on the first resonant frequency and the second resonant frequency.

13. The method of claim 12, wherein determining the lateral misalignment is based on a range of resonant frequencies from the first resonant frequency to the second resonant frequency.

14. The method of claim 13, wherein the determining the lateral misalignment comprises comparing the range of resonant frequencies to one of a plurality of relationships between ranges of resonant frequencies of the resonant circuit and offsets, the method further comprising selecting which of the plurality of relationships to compare to the range of resonant frequencies based on an indication received by the wireless-power receiver from the wireless-power transmitter.

15. The method of claim 12, wherein the lateral misalignment is substantially transverse to at least one of a direction of travel of a vehicle containing the wireless-power receiver or a line through centers of a plurality of power transmitters, the method further comprising steering the vehicle, based on the lateral misalignment, to reduce the lateral misalignment.

16. The method of claim 12, further comprising emitting a signal with each of a plurality of different frequencies from a power transfer element of the resonant circuit.

17. The method of claim 16, further comprising receiving charging power from the power transmitter via the power transfer element, wherein emitting the signal comprises emitting the signal with an emission energy level that is below a charging energy level of the charging power.

18. The method of claim 17, further comprising charging an energy storage device with the charging power, wherein emitting the signal comprises providing current to the power transfer element from the energy storage device to produce a magnetic field that is coupled to the power transmitter.

19. The method of claim 16, wherein the resonant circuit comprises a self-resonant circuit, and wherein determining the first resonant frequency comprises determining a frequency of the signal corresponding to the first time.

20. The method of claim 19, wherein determining the first resonant frequency comprises determining a cycle time of at least one switch of the self-resonant circuit.

21. The method of claim 16, wherein determining each of the first resonant frequency and the second resonant frequency comprises determining at which of the plurality of different frequencies there is at least one of a highest amount of current through, or voltage across, the power transfer element.

22. A wireless-power receiver comprising:
  means for resonating, including a power transfer element, the means for resonating having a resonant frequency;
  power-receiving means coupled to the means for resonating;
  first determining means, coupled to the means for resonating, for:
    determining a first resonant frequency of the means for resonating corresponding to a first time; and
    determining a second resonant frequency of the means for resonating corresponding to a second time; and
  second determining means, coupled to the first determining means, for determining a lateral misalignment of the power-receiving means relative to a wireless-power transmitter based on the first resonant frequency and the second resonant frequency.

23. The wireless-power receiver of claim 22, wherein the lateral misalignment is substantially transverse to at least one of a direction of travel of a vehicle containing the wireless-power receiver or a line through centers of a plurality of power transmitters, the wireless-power receiver further comprising means for steering the vehicle, based on the lateral misalignment, to reduce the lateral misalignment.

24. The wireless-power receiver of claim 22, wherein the second determining means are for determining the lateral misalignment based on a range of resonant frequencies from the first resonant frequency to the second resonant frequency.

25. The wireless-power receiver of claim 24, wherein the second determining means are for determining the lateral misalignment by comparing the range of resonant frequencies to one of a plurality of relationships between ranges of resonant frequencies of the means for resonating and lateral misalignments, the second determining means comprising means for selecting which of the plurality of relationships to compare to the range of resonant frequencies of the means for resonating based on an indication received from the wireless-power transmitter.

26. The wireless-power receiver of claim 22, further comprising transmitting means for causing the power transfer element to emit a signal with each of a plurality of different frequencies.

27. The wireless-power receiver of claim 26, wherein the means for resonating comprise a self-resonant circuit, and wherein the first determining means are for determining the first resonant frequency by determining a frequency of the signal corresponding to the first time.

28. The wireless-power receiver of claim 27, wherein the first determining means are for determining the first resonant frequency by determining a cycle time of at least one switch of the self-resonant circuit.

29. The wireless-power receiver of claim 26, wherein the first determining means are for determining each of the first resonant frequency and the second resonant frequency by determining at which of the plurality of different frequencies there is at least one of a highest amount of current through, or voltage across, the power transfer element.

30. A non-transitory, processor-readable storage medium storing processor-readable instructions configured to cause a processor to:
determine a first resonant frequency of a resonant circuit, of a vehicular wireless-power receiver, corresponding to a first time;
determine a second resonant frequency of the resonant circuit, of the vehicular wireless-power receiver, corresponding to a second time; and
determine an offset of a power transfer element of the vehicular wireless-power receiver relative to a power transmitter based on the first resonant frequency and the second resonant frequency;
wherein the offset of the power transfer element relative to the power transmitter is a lateral misalignment, of the power transfer element relative to the power transmitter, substantially transverse to at least one of a direction of travel of a vehicle containing the vehicular wireless-power receiver or a line through centers of a plurality of power transmitters.

31. The wireless-power receiver of claim 1, wherein the controller is further configured to provide an offset-correction indication including a direction in which to move the power transfer element to reduce the offset.

32. The wireless-power receiver of claim 31, wherein the offset-correction indication further includes a magnitude of the offset.

33. The wireless-power receiver of claim 4, wherein the range of resonant frequencies comprises a magnitude difference between the first resonant frequency and the second resonant frequency.

34. The wireless-power receiver of claim 4, wherein the range of resonant frequencies comprises a set of frequencies from the first resonant frequency to the second resonant frequency.

* * * * *